United States Patent

[11] 3,603,849

[72] Inventor David Kellerman
 1485 South Cardiff, Los Angeles, Calif. 90035
[21] Appl. No. 60,250
[22] Filed Aug. 3, 1970
[45] Patented Sept. 7, 1971

[54] WOUND CAPACITOR TERMINAL CONNECTION ARRANGEMENT
16 Claims, 17 Drawing Figs.
[52] U.S. Cl............................................... 317/260, 317/242
[51] Int. Cl............................................... H01g 1/14
[50] Field of Search.................................. 317/242; 1/260

[56] References Cited
UNITED STATES PATENTS
2,011,555  8/1935  Burlingame.................. 317/260

Primary Examiner—E. A. Goldberg
Attorney—Finkelstein and Mueth

ABSTRACT: A wound capacitor is positioned within a metallic case and, if desired, may be hermetically sealed therein by a pair of dielectric end seals such as glass hermetic seals and has a capacitor-winding body with a first capacitor plate having electrical connection thereto made at one end of the capacitor and a second capacitor plate having electrical connection made thereto at the second end of the capacitor. The capacitor body is provided with at least one dielectric aperture substantially axially aligned therethrough of the type wound with a mandrel, bobbin or winding arrangement for aligning the capacitor. An electrically conductive contact is positioned on each end of the capacitor in an electrical contact with one of the capacitor plates and has a portion that extends into the aperture or apertures. An electrically conductive connector means extends through the dielectric end plates and has a portion extending into the aperture and electrical contact with the electrically conductive contact means therein. A comparatively short portion of the electrically conductive connector means extends outwardly from the outer surface of the capacitor end seal to which terminal wires or other leads may be connected after the completion of the manufacturing of the capacitor and the storing, handling and shipping thereof and upon installation of the capacitor in the circuitry for which it was designed. This provides a very low series resistance in the lead-to capacitor plate connections for AC applications.

INVENTOR
DAVID KELLERMAN
BY
Finkelstein & Mueth
ATTORNEYS

PATENTED SEP 7 1971 3,603,849

INVENTOR
DAVID KELLERMAN
BY
Finkelstein & Muth
ATTORNEYS

WOUND CAPACITOR TERMINAL CONNECTION ARRANGEMENT

BACKGROUND OF THE INVENTION

1. Field of the Invention

This invention relates to the wound capacitor art and more particularly to an improved structural arrangement for providing terminal connections to a capacitor.

This invention has particular utility when utilized with my capacitor arrangement of U.S. Pat. No. 3,260,906.

2. Description of the Prior Art

The utilization of miniaturized and microminiaturized electrical components has resulted in a reduction in the size of many of the components. Such small components are generally lighter in weight than their larger counterparts and thus, are generally desirable for most applications. However, in the capacitor art, for example in wound capacitors, the length of the capacitor body, that is, the actual capacitor, is generally on the order of only one-tenth to one-twentieth of the overall length. The remainder is occupied by the wire leads that have heretofore been attached to the capacitor to provide the electrical connections to the capacitor plates when the capacitor is utilized in the circuitry for which it is designed. The comparatively small capacitors utilized in such miniaturized and microminiaturized applications as above-described have correspondingly small and delicate wire leads that, during subsequent manufacturing stages, storage, handling and shipping are often damaged, bent, broken or otherwise rendered useless. If the leads are broken at a position close to the capacitor body then the entire capacitor had to be discarded since it is generally not feasible to repair the capacitor by applying a new lead.

The problem associated with such damaged or destroyed leads is particularly important in the area of encased and hermetically sealed capacitors wherein the capacitor body is positioned within a case that is then sealed by dielectric end plates at each end thereof through which the leads extend. Any damage to the lead that destroys the hermetical sealing, of course, destroys the capacitor. Similarly, it is virtually impossible to replace a lead in such a capacitor and therefore, the capacitor, even though comparatively expensive and still operative as a capacitor, has to be discarded because of the inability to make a suitable connection of the capacitor in circuitry.

SUMMARY OF THE INVENTION

Accordingly, it is an object of the present invention to provide an improved capacitor.

Another object of the invention is to provide a capacitor in which the capacitor body represents approximately 90-95 percent of the overall capacitor length.

It is another object of the present invention to provide an improved termination connection arrangement for wound capacitors.

It is yet another object of the present invention to provide an improved termination connection arrangement for wound capacitors that are hermetically sealed.

The above and other objects of the present invention are achieved, according to a preferred embodiment thereof, by utilizing an improved terminal connection arrangement according to the principles of the present invention in a wound capacitor of the type that has the electrical connections made to the first capacitor plate at a first end thereof and to the second capacitor plate at the second end thereof. The capacitor may be of the type, in this embodiment, that is positioned within a metallic case means and is provided with a pair of dielectric end caps at each end thereof that are sealed to the case means for providing a hermetically sealed capacitor.

There is provided a wound capacitor body means that has a first end and a second end and a preselected axial length. One of the windings in the wound capacitor comprises a first capacitor plate and alternately wound therewith is a winding comprising a second capacitor plate with dielectric windings therebetween for providing electrical insulation between the first and second capacitor plates. The first capacitor plate has a first plate end connection portion at the first end of the capacitor body means. The second capacitor plate, similarly, has second plate end connection portions adjacent the second end of the capacitor body means. Such wound capacitors are generally wound upon one mandrel or a pair of closely adjacent mandrels, which, upon removal after the winding of the capacitor leave one or more substantially axially oriented apertures extending through the body means from the first end to the second end thereof. In other winding techniques, a dielectric, thin wall, flexible, tube means is positioned in each of the apertures and the windings are made upon the thin wall, flexible, dielectric, tube means. In such capacitors, the tube means provides the apertures through the capacitor body means.

The present invention may be utilized in wound capacitors in which tube means are utilized in the one or more apertures extending through the capacitor body means or in which no tubes are present and the mandrel has been removed after winding to leave the apertures therethrough.

A case means, in hermetically sealed capacitors, peripherally encloses the capacitor body means and has first end walls that extend outwardly from the first end of the capacitor body means and second end walls that extend outwardly from the second end of the capacitor body means. Thus, the axial length of the case means is greater than the capacitor body means. A dielectric liner may also be provided between the case means and the capacitor body means to insure that a shorting of one or both of the capacitor plates to the case means does not occur.

In accordance with known capacitor techniques, the first end and second end of the capacitor body means is provided with electrically conductive coatings such as a solder dip, solder spray or the like so that substantially the entire first end surface of the capacitor body means is in electrical contact with the first capacitor plate and substantially the entire second end of the capacitor body means is in electrical contact with the second capacitor plate. The aperture or apertures extending through the capacitor body means are, of course, left clear and are not overcoated with the solder or other electrically conductive coating means.

A first electrically conductive contact means is positioned at the first end of the capacitor body means and has first portions that overlie and are in electrical contact with the first end coating and thus with the first capacitor plate. Second portions of the first electrically conductive contact means extend into the aperture or apertures. The first electrically conductive contact means is, in preferred embodiments of the present invention, coupled to the electrically conductive coating at the first end of the capacitor body means by, for example, soldering or the like.

A second electrically conductive contact means, similar to the first electrically conductive contact means, is in electrical contact with the second electrically conductive coating at the second end of the capacitor plate. The second electrically conductive contact means has first portions that are in electrical contact with the second electrically conductive coating means and, preferably, is soldered or otherwise coupled thereto. Second portions of the second electrically conductive contact means extend into the aperture at preselected distances from the second end.

A first dielectric end plate means is positioned at the first end surfaces of the case means and is peripherally sealed thereto. A second dielectric end plate means is positioned at the second end portions of the case means and is peripherally sealed thereto.

A first connector means extend through the first dielectric end plate means and is sealed thereto. The first connector means has a first portion that extends into the aperture at the first end thereof and is in electrical contact with the second portions of the first electrically conductive contact means for electrical continuity to the first capacitor plate. A second portion of the first connector means extends a short distance outwardly from the outer surface of the first dielectric end plate and is utilized for connection to terminal wires and/or leads from other components in various circuit applications upon installation of the capacitor. Thus, the second portions of the first connector means may comprise a short loop, an aperture, a post, a threaded post, or the like depending upon the desired type of connection.

A second connector means, similar to the first connector means, extends through and is sealed to the second dielectric end plate means and has first portions extending into the aperture at the second end thereof and in electrical contact with the second portions of the second electrically conductive contact means. Second portions of the second connector means extend a short distance outwardly from the outer surface of the second dielectric means end plate and are utilized for the appropriate circuit connections, in a manner similar to that described above for the first connector means.

Thus, the comparatively rigid second portions of the first and second connector means are short and are not subject to the type of damage and/or destruction that the comparatively thin terminal wires heretofore utilized experience.

In other embodiments of the present invention, the first and/or second electrically conductive contact means may be in the form of a flat, ribbonlike means, a round wire, or be provided with spring grip means that extend into the aperture or apertures for applying a preselected yielding, frictional spring force against first portions of the connection means.

In other embodiments of the present invention the connector means may comprise a generally cup-shaped member that is sealed to the dielectric end plate at its rim and the base of the cup extends into the aperture for electrical contact with the electrically conductive contact means. In this embodiment the outer surface of the end plate is substantially flush and coplanar with the rim of the cup-shaped connector means and thus, no axial length is occupied by the lead means. This arrangement is particularly adaptable for conventional "-banana" connectors utilized extensively in the electronic industry.

BRIEF DESCRIPTION OF THE DRAWINGS

The above and other embodiments of the present invention may be more fully understood from the following detailed description taken together with the accompanying drawings wherein similar reference characters refer to similar elements throughout, and in which.

DESCRIPTION OF THE PREFERRED EMBODIMENTS

Figure 1:
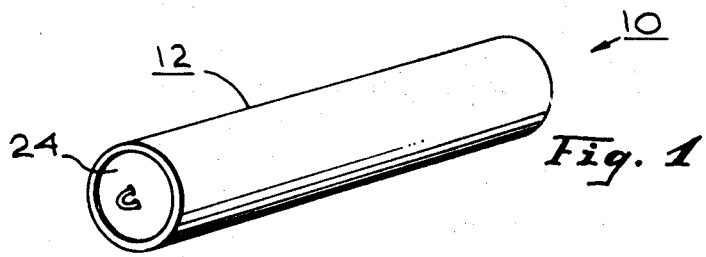
FIG. 1 illustrates a hermetically sealed wound capacitor fabricated in accordance with the principles of the present invention.
Figure 2:
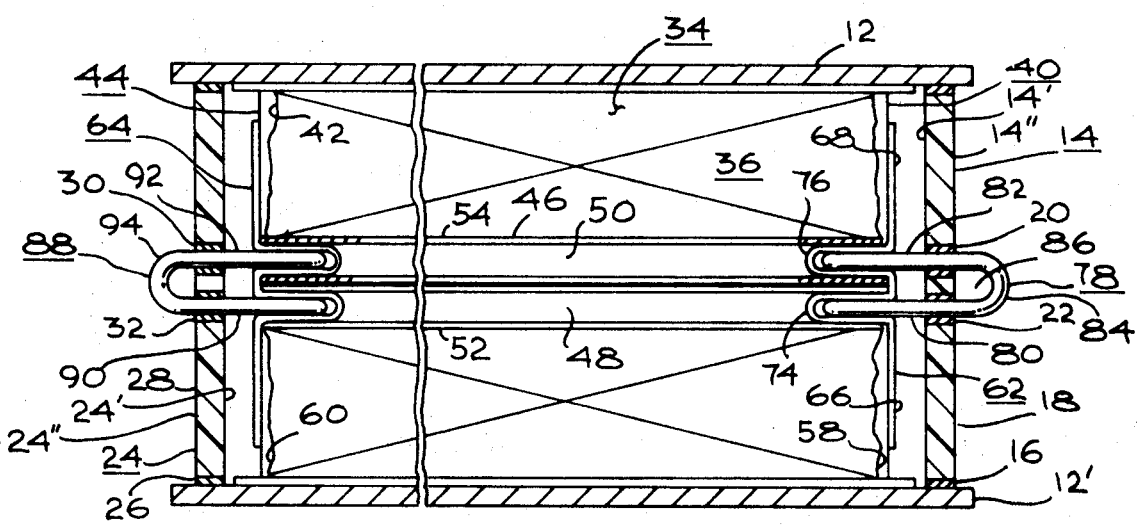
FIG. 2 is a sectional view through the wound capacitor shown in FIG. 1.

Referring now to the drawings, there is shown a preferred embodiment of the present invention, generally designated 10, in FIGS. 1 and 2. The wound capacitor 10 may be comprised of the case means 12 having a first dielectric end plate 14 peripherally sealed to first end portions 12' of the case means 12 by means of, for example, a peripheral metallic tube means 16 that is welded to the end portion 12'. The first dielectric end plate 14 generally has a body portion 18 fabricated from glass or the like in which the peripheral tube means 16 comprises means for peripherally sealing the end plate 14 to the case means 12 by, for example, soldering or welding therebetween. The end plate 14 is also provided with feedthrough tubes 20 and 22. The peripheral tube means 16 and feedthrough tubes 20 and 22 may, for example, be cast in place during the fabrication of the first dielectric end plate 14. The first dielectric end plate 14 and second dielectric end plate 24 are often referred to, variously, as headers, end seals, or glass hermetic seals.

The second dielectric end plate 24 that may be similar in construction to the first dielectric end plate 14 is provided at second end portions 12'' of the case means 12 and sealed thereto by, for example, peripheral tube means 26 that may be cast in place with the glass dielectric body member 28 of the second dielectric end plate 24. Soldering or welding may be utilized to effect the seal between the peripheral tube 26 and second end portion 12'' of the case means 12. A pair of feedthrough tubes 30 and 32 may also be provided in the second dielectric end plate 24.

Positioned within the case means 12 is a wound capacitor body member 34 in which there is provided a first winding comprising a first capacitor plate alternately wound with a second winding comprising a second capacitor plate with dielectric layers wound therebetween for providing electrical insulation. The windings of the first and second capacitor plate and dielectric layers may be of any desired type well known to those skilled in the capacitor art, and are indicated generally by the portion 36 of the capacitor body means 34.

The first capacitor plate of the body means 36 has a first plate end-connecting portion generally indicated at 38 at the first end 40 of the capacitor 10. Similarly, the second capacitory plate has a second plate end connecting portion 42 at the second end 44 of the capacitor 10. The capacitor body means 34 also has walls 46 generally defining a pair of axially aligned apertures 48 and 50 extending therethrough from the first end 40 to the second end 44 thereof.

In this embodiment of the present invention, there is provided a pair of thin-walled, flexible, dielectric tube means 52 and 54 lining the apertures 48 and 50 and the tube means 52 and 54 comprise the tubes upon which the windings are made in fabricating the wound capacitory body means 34. It will be appreciated, however, that many winding operations utilize a removable mandrel and thus there are no dielectric or other tube means provided within the aperture from the first end 40 to the second end 44 of the capacitory body means 34. The present invention may be utilized in any type of wound capacitor arrangement in which there is provided one or more axially aligned apertures such as the aperture 48 or the aperture 50.

A dielectric liner means 56 is provided between the case means 12 and the capacitor body means 34 to prevent shorting of the first capacitor plate and the second capacitor plate to the case means 12.

A first electrically conductive coating means 58 is applied to the first plate end connection portion of the first capacitor plate within the capacitor body means 34 and may, for example, for applied by well-known techniques such as soldering spraying, solder dipping or the like. Similarly, a second electrically conductive coating means 60 is applied by, for example, solder spraying or solder dipping to the second plate end connection portion 42 of the second capacitor plate of the wound capacitor body means 34.

The capacitor 10, shown in FIGS. 1 and 2, may be hermetically sealed or not, depending upon the desired application. The present invention may be utilized in any arrangement desired for providing a capacitor whether or not it is hermetically sealed.

As shown, case means 12 has an axial length between the first end portion 12' and second end portion 12'' that is greater than the axial length of the capacitor body means 34. Thus, there may, if desired, be a clearance between the inner surface 24' of the second dielectric end plate means 24 and the first end 40 and second end 44, respectively, of the wound capacitor body means 34. Other applications, though, may provide for reduction and/or elimination of such clearance space.

A first electrically conductive contact means 62 is provided at the first end 40 of the capacitor body means 34 and a second electrically conductive contact means 64 is provided at the second end 44 of the capacitor body means 34. The first electrically conductive contact means 62 may, in the preferred embodiment of the invention, be fabricated identically to the second electrically conductive contact means 64.

Figure 3:
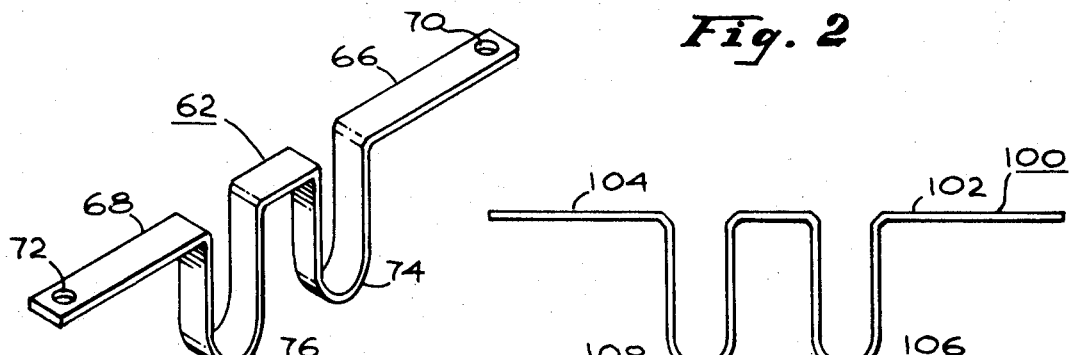
FIGS. 3, 4, 5 and 6 illustrate electrically conductive contact means useful in the practice of the present invention.

FIG. 3 illustrates one electrically conductive contact means 62 useful in the practice of the present invention. As shown, the first electrically conductive contact means 62 has first portions 66 and 68 that overlie the first electrically conductive coating means 58 and is in electrically conductive contact therewith to provide electrical connection to the first capacitor plate of the capacitor body means 34. Apertures 70 and 72 may be provided in the first portions 66 and 68, if desired, so that there is solder flow therethrough to insure electrical coupling of the first portions 66 and 68 to the first electrically conductive coating means 58.

The electrically conductive contact means 62 also has second portions 74 and 76 that extend a preselected distance into the first aperture 48 and second aperture 50 in the body means 34. The particular configuration of the first electrically conductive contact means 62 is shown to be a substantially flat, ribbonlike configuration. As described below in greater detail, other configurations for the electrically conductive contact means may be utilized and it will be appreciated that either the same or different configurations for electrically conductive contact means may be utilized at each end of any capacitor fabricated in accordance with the principles of the present invention.

Thus, the first and second electrically conductive contact means 62 and 64 may be soldered, welded or otherwise electrically coupled to the first end coating 58 and second end coating 60, as desired, in particular applications.

A first electrically conductive connector means 78 extends through the first dielectric end plate means 14 and, in this embodiment of the invention, comprises a generally U-shaped member having leg portions that extend through the feedthrough tubes 20 and 22 and are sealed thereto by, for example, soldering, welding or the like, where such sealing may be desired for hermetic sealing of the capacitor. The first connector means has first portions 80 and 82 that extend from the first dielectric end plate 14 into the apertures 48 and 50, respectively, and are in electrical contact with the second portions 74 and 76 of the first electrically conductive contact means 62 to provide electrical continuity thereto for continuity to the first capacitor plate of the wound capacitor body means 34. The first electrically conductive connector means 78 also has second portion 84 that extends outwardly from the outer surface 14″ of the first dielectric end plate 14 in preselected comparatively short distance and, in this embodiment of this invention, the U-shape of the first electrically conductive connector means 78 provides an aperture 86 through which, for example, a connecting lead may be made when the capacitor 10 is utilized in circuitry for which it is designed.

A second electrically conductive connector means 88 is provided at the second end 44 of the capacitor body means 10 and may be fabricated substantially identically to the first electrically conductive connector means 78 described above. As such, it has first portions 90 and 92 that extend inwardly from the inner surface 24′ of the second dielectric end plate means 24 into the apertures 48 and 50 and are in electrical contact with the second electrically conductive contact means 64 in a manner similar to that described above for the first electrically conductive connector means 78. Similarly, the second electrically conductive connector means 88 has a second portion 94 that extends outwardly from the outer surface 24″ of the second dielectric end plate means 24 a comparatively short distance to allow connection of a lead wire or a terminal wire, as desired, when the capacitor 10 is installed in other circuitry. The second electrically conductive connector means 88 may be sealed, if desired, to the feedthrough tubes 30 and 32 by, for example, soldering, welding or the like.

As can be seen, the capacitor 10 thus has an axial length that is virtually all occupied by the capacitor body means 34. Further, the comparatively fragile and long lead wires that are usually attached to such capacitors have been eliminated to provide a more rugged component for utilization as desired.

Figure 4:
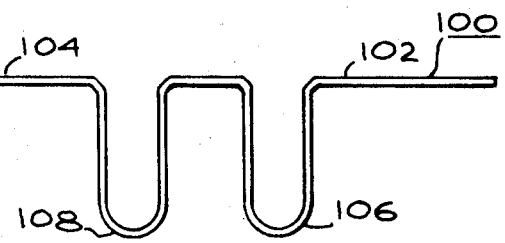

As noted above, the first and second electrically conductive contact means 62 and 64 were fabricated from the flat, ribbonlike strip as shown in FIG. 3. Such electrically conductive contact means may also be provided in a variety of forms. FIG. 4 illustrates an electrically conductive contact means 100 that may be utilized in the present invention in place of the electrically conductive contact means 62 and/or 64. As shown, the electrically conductive contact means 100 is fabricated from a cylindrical wire and has first portions 102 and 104 that overlie and are electrically connected to the electrically conductive coating means. Similarly, it has second portions 106 and 108 that extend into the apertures provided in the body means of the capacitor a preselected distance.

Figure 5:
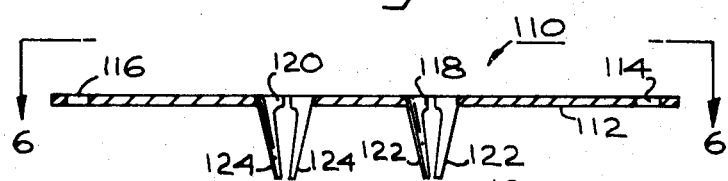
Figure 6:
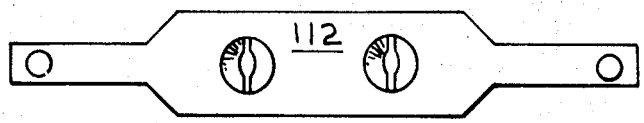

FIGS. 5 and 6 illustrate still another form of the electrically conductive contact means, generally designated 110 that may be useful in the practice of the present invention. As shown, electrically conductive contact means 110, which may be utilized in place of the electrically conductive contact means 62 and/or or 64 as shown in FIG. 2, comprises a thin, flat, platelike structure comprising a first portion 112 for overlying the electrically conductive coating means applied to the end of the capacitor body means. Apertures 114 and 116 may be provided for flowthrough of solder when soldering the electrically conductive contact means 110 to the electrically conductive coating means for good electrical contact therebetween.

A pair of apertures 118 and 120 may also be provided through the first portion 112 and springlike, finger means 122 and 124 are provided such as by extruding into the apertures, extending from the first portion 112 for positioning in the apertures provided in the capacitor body means. In this embodiment of the electrically conductive contact means 110 the springlike, finger means 122 and 124 apply a yielding frictionally gripping spring force in the directions indicated by the arrows 126 and 128 to the first portion of the electrically conductive connector that extends therein.

The capacitor end seals 18 and 28 of FIG. 2 may incorporate leads 78 and 88 sealed into the glass and extending into the interior of the capacitor for electrically conductive contact with the springlike finger means 122 and 124 when so provided in each end. However, it will be appreciated that instead of the type of loop leads 78 and 88 shown in FIG. 2 there may also be provided tubular lead connector means, as described below in greater detail in connection with FIGS. 13 and 14, sealed into the glass for accepting a pin-type connector to make connection to the capacitor plate of the capacitor arrangement 10. The utilization of such a contact means 110 allows direct soldering through the apertures 118 and 120 to the sprayed foil ends of the capacitor for better connection. Additionally, this provides a direct low electrical loss termination means from the foil or other type of capacitor plate to the leads. The resistivity of such a connection is extremely low and thus, there is very little heating occasioned when capacitors fabricated in accordance with the principles of the present invention are utilized in AC applications.

Further, it will be appreciated, that in accordance with the principles of the present invention the utilization of lead means sealed to the glass capacitor end plates and slidingly engaging the contact means within the capacitor better mechanical life is obtained. That is, since the capacitor windings consists, to a large extent, of plastic or other dielectric insulating layers, which have a higher rate of expansion and contraction than the metal or glass tubes of hermetically cased capacitors, by having the lead wires sealed to the glass and slidingly engaging the contact means for making electrical contact to the capacitor plates, the winding can expand and contract upon temperature cycling without damage to the electrical connection to the plates. This is achieved since the leads slide in and out of the apertures provided in the contact means to compensate for the differential axial expansion of the winding section and the outside case. Further, it will be appreciated that the leads sealed to the capacitor end plates help support the windings within the case and thus, provide a more stable mechanical configuration.

As noted above, the embodiment selected for illustration as a preferred embodiment of the present invention in FIGS. 1 and 2 has two apertures 48 and 50 extending throughout the axial length of the capacitor body means 34. Those skilled in the art may readily appreciate that a single aperture may also be utilized, in which case there will only be a second portion of the electrically conductive contact means and, correspondingly, a single first portion of the electrically conductive connector means for insertion therein.

Figure 7:
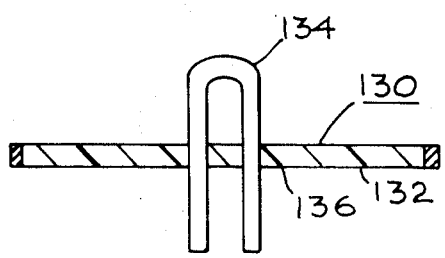
FIGS. 7, 8, 9 and 10 illustrate connector means useful in the practice of the present invention.

FIG. 7 illustrates another embodiment of an electrically conductive connector means useful in the practice of the present invention wherein two apertures are provided. As shown, this embodiment 130 has a dielectric end plate means 132 with a cast-in-place, generally U-shaped electrically conductive connector means 134. Thus, by casting the electrically conductive connector means 134 in place in the glass body member 136 of the dielectric end plate means 132 it is sealed in place and separate feedthrough tubes such as that shown in FIG. 2 need not be utilized.

Figure 8:
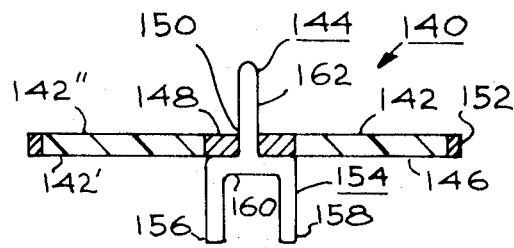

FIG. 8 illustrates another embodiment, generally designated 140, of a dielectric end plate 142 and electrically conductive connector means 144. As shown, the dielectric end plate means 142 may have a body member 146 fabricated from glass in which there is provided a single feedthrough means 148 having a wall defining aperture 150 therein. Peripheral sealing means such as peripheral tube means 152 may also be provided as cast-in-place when the glass body member 146 is cast along with the feedthrough portion 148.

In this embodiment of the invention the electrically conductive means 144 has a generally U-shaped member 154 that has a pair of legs 156 and 158 comprising the first portions for insertion into the axially aligned apertures in the capacitor body means and a base portion 160 to provide the connection between the leg members 156 and 158. However, in this embodiment of the invention, the base 160 of the U-shaped portion of 154 is positioned on the inside surface 142' of the dielectric end plate 142 and a post member 162 is coupled to the base portion 160 and extends through the aperture 150 in the feedthrough portion 148 and, if desired, is sealed thereto by soldering, welding or the like. The post portion 162 may then generally be utilized as an end terminal connection portion for connection to leads or other circuit elements outwardly from the outer surface 142'' of the dielectric end plate 142.

Figure 9:
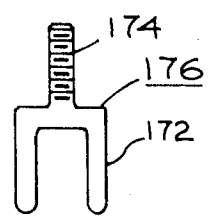

FIG. 9 illustrates another connector means 170 useful in the practice of the present invention. The connector means 170 has a generally U-shaped portion 172 that is substantially identical to the U-shaped portion 154 of the connector 144 shown in FIG. 8. However, in this embodiment a post member 174 is threaded to allow installation of threaded connections to external circuitry.

Figure 10:
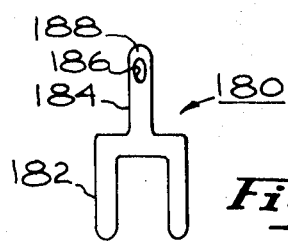

FIG. 10 illustrates another electrically conductive connector means generally designated 180 useful in the practice of the present invention. The electrically conductive connector means 180 has a generally U-shaped portion 182 that may be substantially identical to the U-shaped portion 154 shown in FIG. 8 for the electrical connector 144. The post portion 184 of the connector 180 has walls 186 defining an aperture 188 therethrough for allowing the insertion of wire leads and solder connections thereto. It will also be appreciated that the connector 144, the connector 170 or the connector 180 may be conveniently cast-in-place in a manner similar to that shown for the connector 134 in FIG. 7, rather than being welded or soldered or otherwise sealed through a feedthrough means in the dielectric end plate.

In the embodiment of the invention heretofore described there has been shown various arrangements utilizing a pair of apertures through the capacitor body means and terminal connection means on the electrically conductive connector that are external the outer surface of the dielectric end plates. The principles of the present invention may also be utilized in providing electrical connection to the capacitor inwardly of outer surface of the dielectric end plate in order to further minimize any axial length of the capacitor and allow utilization of, for example, conventional "banana" connectors.

Figure 11:
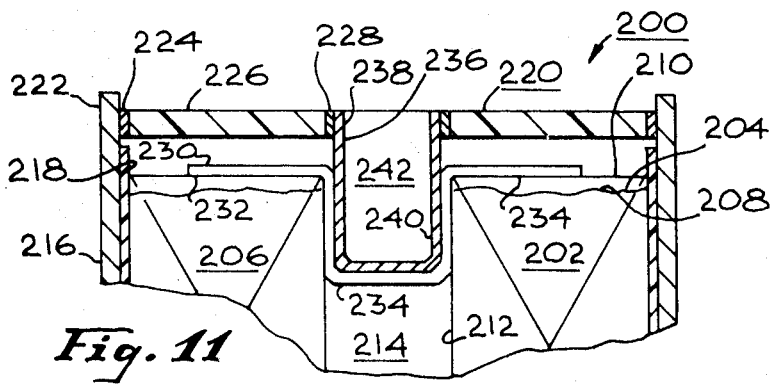
FIGS. 11 and 12 illustrate another embodiment of the present invention.
Figure 12:
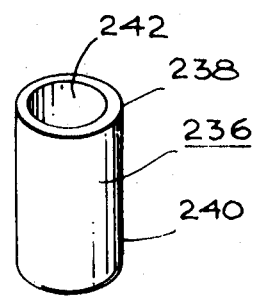

FIG. 11 and FIG. 12 illustrate one embodiment generally designated 200 according to the principles of the present invention in which such connection means are provided. As shown in FIG. 11 and 12, there is provided, in the capacitor 200, a capacitor body means 202 having a first end 204. It will be appreciated that the second end (as shown in FIG. 11) is fabricated identically to the first end 204.

The capacitor body means 202 has a first capacitor plate and a second capacitor plate in the winding portion 206 and the first capacitor plate has a first plate end connection portion 208 to which a first electrically conductive end terminal coating means 210 is applied to provide electrical continuity to the first capacitor plate within the winding portion 206. The capacitor body means is also provided with walls 212 defining an aperture 214 therethrough from the first end 204 to the second end thereof.

A case means 216 which, for example, may be similar to the case means 12 shown in FIG. 2, is provided for encircling the capacitor body means 202 and a dielectric linear means 218 which, for example, may be similar to the dielectric liner 56 shown in FIG. 2, is provided to prevent shorting of the first capacitor plate or second capacitor plate in the capacitor body means 202 to the case means 216. A first dielectric end plate 220 is sealed to first end portions 222 of the case means 216 by a peripheral seal means comprising a peripheral tube member 224 which, for example, may be cast-in-place when the glass body portion 226 of the first dielectric end plate 220 is fabricated and may be sealed to the case means 222 by, for example, soldering, welding or the like.

A feedthrough tubular means 228 is provided in the first dielectric end plate 220 and, for example, may also be cast in place.

A first electrically conductive contact means 230 is provided and has first portions 232 and 234 that overlie the first electrically conductive end coating 210 and is electrically coupled thereto by, for example, soldering, welding or the like. The first electrically conductive contact means 230 may be similar to the first electrically conductive contact means 62 shown in FIG. 3, first electrically conductive contact means 100 shown in FIG. 4, first electrically conductive contact means 110 shown in FIGS. 5 and 6 depending upon the particular desired application except that, of course, since there is only a single aperture 214 extending through the capacitor body means 202 only a single second portion 234 of first electrically conductive contact means 230 is provided extending into the aperture 214.

A first electrically conductive connector means 236 is a generally cup-shaped member, as illustrated more fully in FIG. 12. As shown, the generally cup-shaped electrically conductive connector means 236 has a rim portion 238 that, for example, may be coupled or sealed to the feedthrough tube 228, and a second portion 240 that extends downwardly into the aperture 214 and is in electrical contact with the first electrically conductive contact means 234. The cavity 242 defined by the cup-shaped first electrically conductive connector means 236 may be fabricated in any desired shape, for example, to accept a conventional "banana" connector often utilized in electrical and electronic application.

Figure 13:
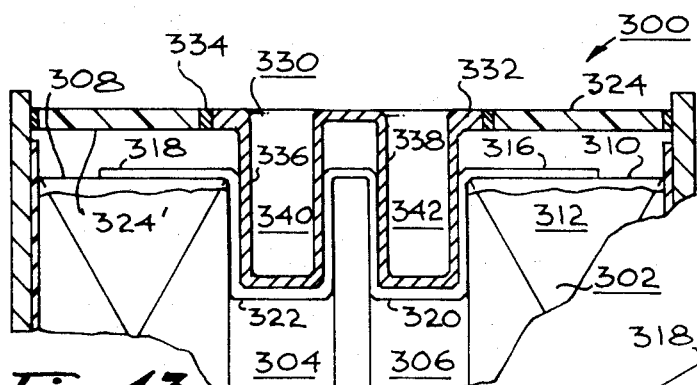
FIGS. 13 and 14 illustrate another embodiment of the present invention.
Figure 14:
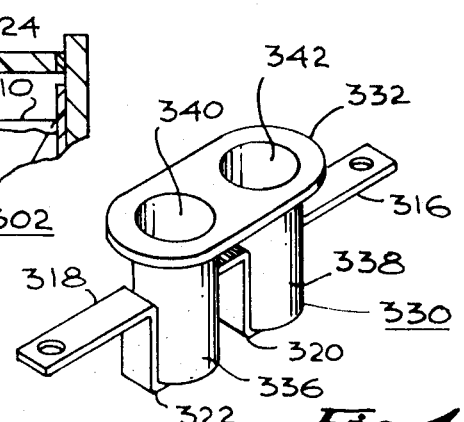

FIGS. 13 and 14 illustrate an embodiment of the present invention generally designated 300 that is similar to the embodiment 200 shown in FIGS. 11 and 12 except that the capacitor body means 302 is provided with a pair of apertures 304 and 306 extending therethrough from the first end 308 thereof to the second end (not shown in FIG. 13 but virtually identical thereto).

It will be noted that single aperture 214 shown in the embodiment 200 and the two apertures 304 and 306 shown in one embodiment 300 of FIG. 13 are not provided with dielectric tubular members positioned therein.

The first electrically conductive coating means 310 is applied to the first end 308 of the capacitor body member 302 to provide electrical contact with a first capacitor plate contained within the winding portion 312 of the capacitor body means 302.

A first electrically conductive contact means 316 which is illustrated in greater detail in FIG. 14 is provided and has a first portion comprising a generally flange-type portion 318 overlying the coating 310 to provide electrical continuity to the first capacitor plate within the winding portion 312. The first portion 318 extends around a pair of second portions 320 and 322 that extend inwardly from the first dielectric end plate means 324 into the first and second apertures 304 and 306, respectively.

A first electrically conductive connector means 330 has a flange portion 332 that is sealed to a feedthrough tube 334 in the first dielectric end plate 324, for example, by soldering, welding or the like and a second portion comprising a pair of generally cup-shaped members 336 and 338 that extend inwardly from the inner surface 324' of the first dielectric end plate 324 into the apertures 304 and 306 of the capacitor body means 302 and is in electrical contact with the first electrically conductive contact means 316. Thus, the first electrically conductive contact means 316 may be similar to the first electrically conductive contact means 62 shown in FIG. 3.

However, in this embodiment of the invention the first electrically conductive connector means 330 has the pair of cavities 340 and 342 defined by the pair of cup-shaped members 336 and 338, respectively, that may be utilized for accepting typical connectors such as "banana" connectors.

As noted above, the principles of the present invention may also be utilized in arrangement similar to those shown in FIG. 2 wherein a single aperture through the capacitor body means is provided. FIG. 5 illustrates an electrically conductive connector means 350 having a single first portion 352 that projects into the single aperture provided for electrical contact with the first electrically conductive contact means. The flange portion 354 may be positioned in the interior of the dielectric end plate or, it may be cast in place. The external post portion 356 may be similar to the threaded post portion 174 or may be provided without threads similar to the portion 162.

Figure 16:
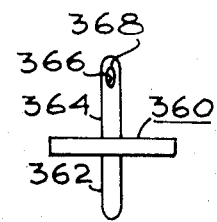

Alternatively, as shown in FIG. 16, an electrically conductive connector means 360 may be provided with a single first portion 362 for positioning in a single aperture of the capacitor body means for electrical contact with a first electrically conductive contact means. The connector 360 has a post portion 364 having walls 366 defining an aperture 368 thereto in a manner similar to the embodiment shown in FIG. 10. Similarly, the connector means 360 may be cast-in-place in a dielectric end plate means.

Figure 17:
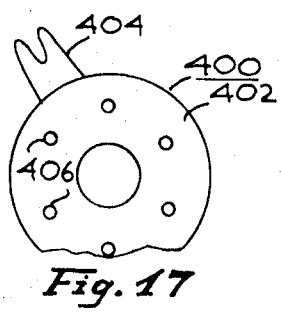

FIG. 17 illustrates another form of an electrically conductive contact means generally designated 400 useful in the practice of the present invention particularly in those applications involving a single core-type capacitor. As shown on FIG. 17, the plate 400 has first portion 402 that overlies the electrically conductive coating means that may be applied to the end portions of the capacitor plate as described above, and a springlike finger means portion 404 that may be extruded from the first portion 402 and that extends into the single core of the capacitor upon which it is utilized. Thus, this embodiment of the electrically conductive contact means 400 is similar to electrically conductive contact means 110 shown in FIGS. 5 and 6 except that it is provided with a single springlike finger means 404 rather than the two springlike finger means described above.

The first portion 402 is also provided with a plurality of solder hole apertures 406 therethrough for making solder connections to the electrically conductive coating and/or directly to the foil or other end surfaces of the capacitor plates. The use of a large diameter for the first portion 402 allows utilization of the present invention in high current, AC application without the need of applying a high degree of heat during the connection of the electrically conductive contact plate means 400 to the, for example, foil windings of typically foil-wound capacitors. Such windings, generally, cannot survive excessive heat utilized in soldering applications.

It will be appreciated that such a connection, when utilized with the appropriate lead means such as those described above connected to the capacitor end plates, provides very low inductance and very low series resistance thereby improving the power factor and current handling capacity of the capacitor. This is particularly important for power factor corrections, in SCR inverters and energy storage applications. The plurality of apertures 406 permits localized soldering of the contact means 404 and thus does not require bringing the entire capacitor mass up to a soldering temperature all at the same time. When the capacitor must be so heated to connect prior art types of connections to the capacitor plates, damage to the capacitor often resulted. It will be appreciated that pure mechanical pressure exerted on the contact means 400 by squeezing each end of the capacitor by means of the capacitor end plates may eliminate even the need for soldering of the contact means 400 to the capacitor plate. Good electrical connections, because of the large area of the first portion 402 may still be made and a very low resistance connection through the lead means built into the capacitor end plates can be achieved.

Figure 15:
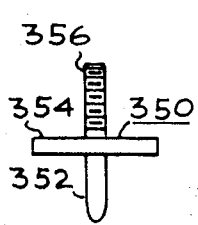
FIGS. 15, 16 and 17 illustrate other embodiments.

From the above, it will be appreciated that different types of end connections can equally well be utilized in the same capacitor. For example, in single-core capacitors one end may be provided with the female or internal connector arrangement shown in FIGS. 11 and 12 and the other end of the capacitor provided with a male or external or pin-type connector such as that shown in FIGS. 15 and 16. Similarly, in the two-core capacitor arrangements one end of the capacitor may be provided with a female or internal-type connector such as that shown in FIGS. 13 and 14 and the other end with an external, male, pin-type connector such as those shown in FIGS. 8, 9 or 10.

This concludes the description of applicant's invention providing an improved capacitor termination connection arrangement. It will be appreciated by those skilled in the art that many variations and adaptations thereof may be made and the appended claims are intended to cover all such variations and adaptations falling within the true scope and spirit of the present invention.

I claim:

1. A terminal connection arrangement for wound capacitors of the type having an electrical connection of a lead to one of the capacitor plates at a first end and electrical connection of the other lead to the other capacitor plate at a second end, comprising, in combination:

a wound capacitor body means having a first end and a second end, and a preselected axial length therebetween, and having an alternately wound first capacitor plate and a second capacitor plate, and alternately wound dielectric means for insulating said first capacitor plate from said second capacitor plate, and said first capacitor plate having first plate end connection portions adjacent said first end of said capacitor body means, and said second capacitor plate having second plate end connection portions adjacent said second end of said capacitor body means, and said capacitor body means having wall defining a pair of axially oriented apertures therethrough from said first end to said second end;

a case means peripherally enclosing said capacitor body means and having first end walls adjacent said first end of said capacitor body means and extending outwardly therefrom, and second end walls adjacent said second end of said capacitor body means and extending outwardly therefrom, and said case means having an axial length greater than said preselected axial length of said capacitor body means, and each of said first and said second end walls of said case means having a peripheral ceiling portions thereof;

a first electrically conductive contact means having first portion in electrical contact with said first plate end connecting portions of said first capacitor plate at said first end of said capacitor body means, and a second portion extending a preselected distance into each of said pair of apertures from said first ends thereof;

a second electrically conductive contact means having first portions in electrical contact with said second plate end-connecting portions of said second capacitor plate at said second end of said capacitor body means, and a second portion extending a preselected distance into each of said pair of apertures from said second end thereof;

a first dielectric end plate means overlying said first end of said capacitor body means;

a second dielectric end plate means overlying said second end of said capacitor body means;

peripheral seal means for sealing said first and second dielectric end plates to said sealing portions of said first end walls and said second end walls, respectively, said case means;

first connector means extending through said first dielectric end plate means and sealed thereto, and said first connector means having first portions extending into said pair of apertures in said capacitor body means and in electrical contact with said first electrically conductive contact means, and having a second portion extending outwardly from said first dielectric means for connection to a first terminal wire; and second connector means extending through said second dielectric end plate means and sealed thereto, and said second connector means having a first portion extending into said pair of apertures in said capacitor body means and in electrical contact with said second electrically conductive contact means, and having a second portion extending outwardly from said second dielectric means for connection to a second terminal wire.

2. The arrangement defined in claim 1 wherein:
at least one of said first and said second electrically conductive contact means comprises a flat, ribbonlike strip.

3. The arrangement defined in claim 2 wherein:
at least one of said first and said second electrically conductive contact means comprises a wire means.

4. The arrangement defined in claim 3 wherein:
at least one of said first portion of each of said first and second electrically conductive contact means comprises a thin, flat, platelike means, and at least one of said second portions of each of said first and second electrically conductive contact means comprises a first leg member in each of said pair of apertures and a second leg member in each of said pair of apertures and said second leg members in spring force exerting relationship to said first leg member for yieldingly frictionally gripping said first portions of said first and second connector means, respectively.

5. The arrangement defined in claim 1 wherein:
said first connector means and said second connector means each comprise a cylindrical wire U-shaped member having a pair of legs comprising said first portions, and a base comprising said second portion, and said base is spaced from the outer surface of the adjacent dielectric end plate means.

6. The arrangement defined in claim 5 wherein:
said dielectric base means is glass; and
said U-shaped members are each cast-in-place in said dielectric base means for sealing thereto.

7. The arrangement defined in claim 5 wherein:

each of said first and second dielectric end plate means has a pair of apertures therethrough aligned with said pair of apertures in said capacitor body means;

a tube means positioned in each of said pair of apertures in each of said first and second dielectric end plate means and sealed thereto; and said legs of each of said first and second connector means extending through said tube means and sealed thereto.

8. The arrangement defined in claim 1 wherein:
said first connector means and said second connector means each comprises a generally U-shaped member having a pair of legs comprising first portions thereof, and a base connecting said pair of legs, and extending through said first and said second dielectric end plate means respectively, to regions external said capacitor body means for providing terminal connections to said first capacitor plate and said second capacitor plate, respectively.

9. The arrangement defined in claim 8 wherein said post means is threaded in regions external said capacitor body means.

10. The arrangement defined in claim 8 wherein:
said post means has walls defining an aperture therethrough in regions external said capacitor body means.

11. A terminal connection arrangement for wound capacitors of the type having electrical connection to lead to one of the capacitor plates at a first end and electrical connection of the other lead to the other capacitor plate at a second end, comprising, in combination:

a wound capacitor body means having a first end and a second end, and a preselected axial length therebetween, and having an alternatively wound first capacitor plate and a second capacitor plate, and alternatively wound dielectric means for insulating said first capacitor plate from said second capacitor plate, and said first capacitor plate having first plate end connection portions adjacent said first end of said capacitor body means, and said second capacitor plate having second plate end connection portions adjacent said second end of said capacitor body means, and said capacitor body means having wall defining an axially oriented aperture therethrough from said first end to said second end;

a case means peripherally enclosing said capacitor body means and having first end walls adjacent said first end of said capacitor body means and extending outwardly therefrom, and second end walls adjacent said second end of said capacitor body means and extending outwardly therefrom, and said case means having an axial length greater than said preselected axial length of said capacitor body means, and each of said first and said second end walls of said case means having a peripheral ceiling portions thereof;

a first electrically conductive contact means having first portions in electrical contact with said first plate end connecting portions of said first capacitor plate, and a second portion extending in preselected distances into said aperture from said first end thereof;

a second electrically conductive contact means having first portions in electrical contact with said second plate end-connecting portions of said second capacitor plate, and a second portion extending a predetermined distance into said aperture in said capacitor body means from said second end thereof;

a first dielectric end plate means, overlying said first end of said capacitor body means;

a second dielectric end plate means overlying said second end of said capacitor body means;

peripheral seal means for sealing said first and second dielectric end plates to said sealing portion of said first end walls and said second end walls, respectively, said case means;

first connector means extending through said first dielectric end plate means and sealed thereto, and said first connector means having first portions extending into said aperture for electrical contact with said first electrically conductive contact means and having a second portion extending outwardly from said first dielectric means to regions external said capacitor body means for connection to a terminal; and second connector means extending through said second dielectric end plate means and said second connector means having first portions extending into said apertures and said capacitor body means in electrical contact with said second electrically conductive contact means, and having a second portion extending outwardly from said second dielectric means to regions external said capacitor body means for connection to a terminal wire.

12. The arrangement defined in claim 11 wherein:
at least one of said first and said second electrically conductive contact means comprises a flat, ribbonlike strip.

13. The arrangement defined in claim 11 wherein:
at least one of said first and second electrically conductive contact means comprises a wire means.

14. The arrangement defined claim 11 wherein:
at least one of said first portions of each of said first and second electrically conductive contact means comprises a thin, flat, platelike means and at least one of said second portions of each of said first and second electrically conductive contact means in said apertures in said capacitor body means comprises a first leg member and a second leg member in spring force exerting relationship to said first leg member for yieldingly frictionally gripping said first portions of said connector means.

15. A terminal connection arrangement for wound capacitors of the type having electrical connection of lead to one of the capacitor plates at a first end and electrical connection of the other lead to the other capacitor plate at a second end, comprising, in combination:

a wound capacitor body means having a first end and a second end, and a preselected axial length therebetween, and having an alternatively wound first capacitor plate and a second capacitor plate, and alternatively wound dielectric means for insulating said first capacitor plate from said second capacitor plate, and said first capacitor plate having first plate end connection portions adjacent said first end of said capacitor body means, and said second capacitor plate having second plate end connection portions adjacent said first end of said capacitor body means, and said second capacitor plate having second plate end connection portions adjacent said second end of said capacitor body means, and said capacitor body means having wall defining an axially oriented aperture therethrough from said first end to said second end;

a case means peripherally enclosing said capacitor body means and having first end walls adjacent said first end of said capacitor body means and extending outwardly therefrom, and second end walls adjacent said second end of said capacitor body means and extending outwardly therefrom, and said case means having an axial length greater than said preselected axial length of said capacitor body means, and each of said first and said second end walls of said case means having a peripheral ceiling portions thereof;

a first electrically conductive contact means having first portions in electrical contact with said first plate end connecting portions of said first capacitor plate, and a second portion extending in preselected distances into said aperture from said first end thereof;

a second electrically conductive contact means having first portions in electrical contact with said second plate end connection portions of said second capacitor plate, and a second portion extending a predetermined distance into said aperture in said capacitor body means from said second end thereof;

a first dielectric end plate means overlying said first end of said capacitor body means a second dielectric end plate means overlying said second end of said capacitor body means;

peripheral seal means for sealing said first and second dielectric end plates to said sealing portions of said first end walls and said second end walls, respectively, said case means;

a first and second connector means a generally cup-shaped electrically conductive means having a rim portion and a bottom portion, and said cup-shaped means coupled to said first and second dielectric end plate means, respectively, and said rim portion and said bottom portion extending into said aperture for electrical contact with said first and said second electrically conductive contact means.

16. A terminal connection arrangement for wound capacitors of the type having electrical connection lead of one of the capacitor plates at a first end and electrical connection of the other lead to the other capacitor plate at a second end, comprising, in combination:

a wound capacitor body means having a first end and a second end, and a preselected axial length therebetween, and having an alternatively wound first capacitor plate and a second capacitor plate, and alternatively wound dielectric means for insulating said first capacitor plate from said second capacitor plate, and said first capacitor plate having first plate end connection portions adjacent said first end of said capacitor body means, and said second capacitor plate having second plate end connection portions adjacent said second end of said capacitor body means, and said capacitor body means having wall defining a pair of axially oriented apertures therethrough from said first end to said second end;

a case means peripherally enclosing said capacitor body means and having first end walls adjacent said first end of said capacitor body means and extending outwardly therefrom, and second end walls adjacent said second end of said capacitor body means and extending outwardly therefrom, and said case means having an axial length greater than said preselected axial length of said capacitor body means, and each of said first and said second end walls of said case means having a peripheral ceiling portion thereof;

a first electrically conductive contact means having first portion in electrical contact with said first plate end connecting portions of said first capacitor plate at said first end of said capacitor body means, and a second portion extending a preselected distance into each of said pair of apertures from said first ends thereof;

a second electrically conductive contact means having first portion in electrical contact with said second plate end connecting portions of said second capacitor plate at said second end of said capacitor body means, and a second portion extending a preselected distance into each of said pair of apertures from said second ends thereof;

a first dielectric end plate means overlying said first end of said capacitor body means;

a second dielectric end plate means overlying said second end of said capacitor body means;

peripheral seal means for sealing said first and second dielectric end plates to said sealing portions of said first end walls and said second end walls, respectively, said case means;

a first and a second electrically conductive connector means, and each of said first and second electrically conductive connector means comprising a pair of generally cup-shaped members having a rim portion and a base portion and each of said pair of said cup-shaped members of said first connector means coupled to said first dielectric end plate means and said rim portion thereof and base portions extending into said pair of apertures for electrical contact with said first electrically conductive contact means, and each of said generally cup-shaped members of said second connector means having rim portions and a base portion and coupled to said dielectric end plate means on said rim portions thereof and said base portions extending into said pair of apertures for electrical contact with said electrically conductive contact means.